United States Patent
Shimada (10) Patent No.: US 6,690,649 B1
(45) Date of Patent: Feb. 10, 2004

(54) QOS MANAGEMENT APPARATUS

(75) Inventor: Naohiro Shimada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/315,432

(22) Filed: May 20, 1999

(30) Foreign Application Priority Data

May 22, 1998 (JP) .......................................... 10-156833

(51) Int. Cl.$^7$ ................................................. H04J 3/14
(52) U.S. Cl. .................. 370/238; 370/352; 370/395.21; 370/395.4; 370/395.5; 370/468; 370/493; 370/903; 370/905
(58) Field of Search ................................ 370/229, 230, 370/230.1, 231, 232, 235, 235.1, 237, 395.1, 395.2, 395.21, 395.5, 395.51, 414, 429, 468

(56) References Cited

U.S. PATENT DOCUMENTS

| | | | | | |
|---|---|---|---|---|---|
| 5,898,668 | A | * | 4/1999 | Shaffer ........................ | 370/230 |
| 5,898,673 | A | * | 4/1999 | Riggan et al. ............... | 370/237 |
| 6,091,709 | A | * | 7/2000 | Harrison et al. ............. | 370/235 |
| 6,104,700 | A | * | 8/2000 | Haddock et al. ............. | 370/235 |
| 6,147,998 | A | * | 11/2000 | Kelley et al. ................ | 370/231 |
| 6,154,776 | A | * | 11/2000 | Martin ........................ | 709/226 |
| 6,201,971 | B1 | * | 3/2001 | Purnadi et al. .............. | 455/450 |
| 6,360,076 | B1 | * | 3/2002 | Segura et al. ............... | 455/67.1 |
| 6,363,058 | B1 | * | 3/2002 | Roobol et al. ............... | 370/310 |
| 6,385,171 | B1 | * | 5/2002 | Takase et al. ............... | 370/235 |
| 6,385,201 | B1 | * | 5/2002 | Iwata .......................... | 370/400 |
| 6,404,735 | B1 | * | 6/2002 | Beshai et al. ................ | 370/230 |
| 6,449,259 | B1 | * | 9/2002 | Allain et al. ................. | 370/253 |

FOREIGN PATENT DOCUMENTS

| | | |
|---|---|---|
| JP | 3-41845 | 2/1991 |
| JP | 3-64230 | 3/1991 |
| JP | 6-188880 | 7/1994 |
| JP | 6-216927 | 8/1994 |
| JP | 6-276254 | 9/1994 |
| JP | 7-154397 | 6/1995 |
| JP | 7-221791 | 8/1995 |
| JP | 9-149046 | 6/1997 |
| JP | 9-231143 | 9/1997 |
| JP | 11-275079 | 10/1999 |

OTHER PUBLICATIONS

Japanese Office Action issued Mar. 27, 2001 in a related application with English translation of relevant portions.
1998 Grand Meeting of the Electronic Information and Communications Society B-6-46.
1998 Grand Meeting of the Electronic Information and Communications Society PB-2-2.
Japanese Office Action issued Mar. 28, 2000 in a related application with English translation of relevant portions of the same.
B-6-46, General Meeting of the Denshi Joho Tsushin Gakkai (Electronic Information Communications Society), Mar., 1998.

* cited by examiner

*Primary Examiner*—Douglas W. Olms
*Assistant Examiner*—Van Nguyen
(74) *Attorney, Agent, or Firm*—Dickstein, Shapiro, Morin & Oshinsky, LLP.

(57) ABSTRACT

A QoS management apparatus in which the quality of the requested QoS for each path and different values of the state are managed. A QoS monitor, a registered QoS, and an operation determining function are provided for each path, and the QoS is precisely managed.

16 Claims, 11 Drawing Sheets

QOS MANAGEMENT APPARATUS

BACKGROUND OF THE INVENTION

1. Field of the Invention

The present invention relates to a QoS management apparatus for managing the QoS (quality of service) or the CoS (class of service) for communication. In this specification, the QoS generally refers to the QoS and the CoS.

2. Description of the Prior Art

Figure 11:
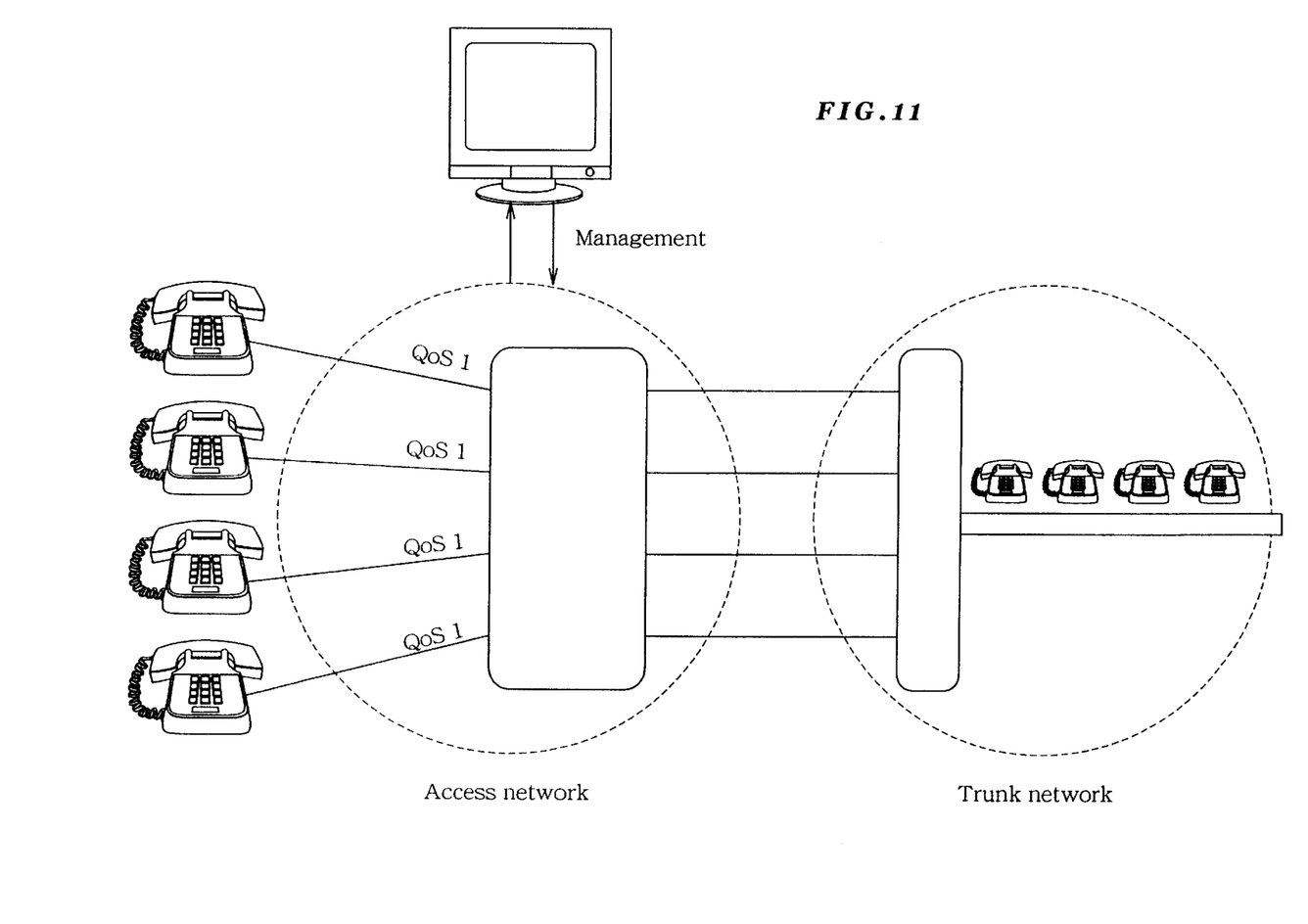
FIG. 11 is a block diagram showing an example of the configuration of the network to which the present invention is applied.

FIG. 11 is a block diagram of a conventional communication network relating to the QoS management.

As shown in FIG. 11, the service provided through an access network and a trunk network has been limited to telephone.

Therefore, the value of a requested QoS is constant for every path.

Figure 12:
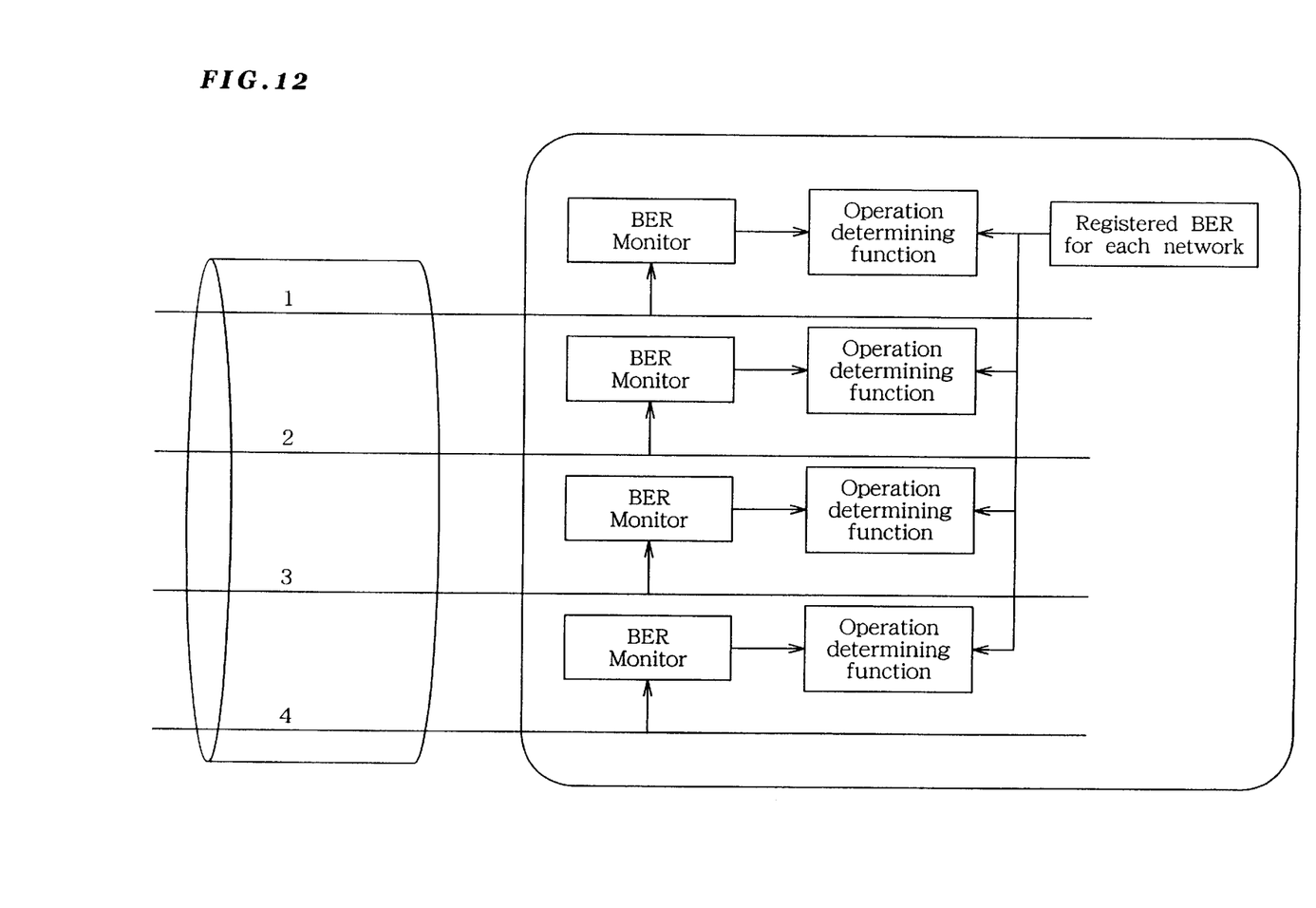
FIG. 12 is a block diagram of the conventional apparatus.

FIG. 12 is a block diagram of the configuration of the conventional QoS management apparatus. A QoS monitor is inserted into each of the paths 1, 2, 3, and 4. In an example shown in FIG. 12, a QoS is denoted by a BER (Bit Error Rate), and a BER monitor is inserted into each of the paths 1, 2, 3, and 4, and monitors the current BER of the corresponding path.

Since the value of the BER to be attained by each path is constant through a network, a BER is registered for each network.

The function of determining an operation is provided for each path, compares the value of the BER monitored by the BER monitor of the path with a value of a registered BER for each network, and performs a predetermined operation based on the comparison result.

Japanese Patent Application Laid-Open No. 6-188880 provides a system comprising a transmission server and a reception server connected to each other through a path containing an exchange unit. The transmission server and the reception server measure the state of their own system relating to the quality of the communications, and determine the band of the path depending on the measured state of their own system, thereby appropriately setting the band between the servers without a network manager. Thus, a prompt action can be taken against a sudden state change such as the concentration of cells on a certain server or a network. As a result, a system can be provided with high efficiency in communications.

The communication control apparatus disclosed by Japanese Patent Application Laid-Open No. 6-276254 (hereinafter referred to as the document) comprises a network control unit for controlling the communication depending on the type of network, a transport layer control unit for controlling the communication between end systems, and a higher order layer control unit for controlling the communication of higher order units than the transport layers, wherein a different QoS value is requested for each network, and the transport layer control unit has the function of selecting a QoS table for managing the service quality for each network and a network corresponding to the service quality requested by a higher order layer by referring to the QoS table.

According to Japanese Patent Application Laid-Open No. 9-231143, a QoS control object operating in each node monitors the resources required by the communication session existing in each node. When, for example, a QoS control message to request an increase of the resources assigned to a predetermined session is issued to each node on network from a gate-way node, the resources assigned to other communication sessions are assigned to the current communication session based on the priority of the communication session existing in each node, and the utilization state of the resources. Thus, for example, when a predetermined session temporarily transfers a large volume of data, a large volume of resources are temporarily assigned to the session, thereby effectively utilizing the resources.

Figure 13:
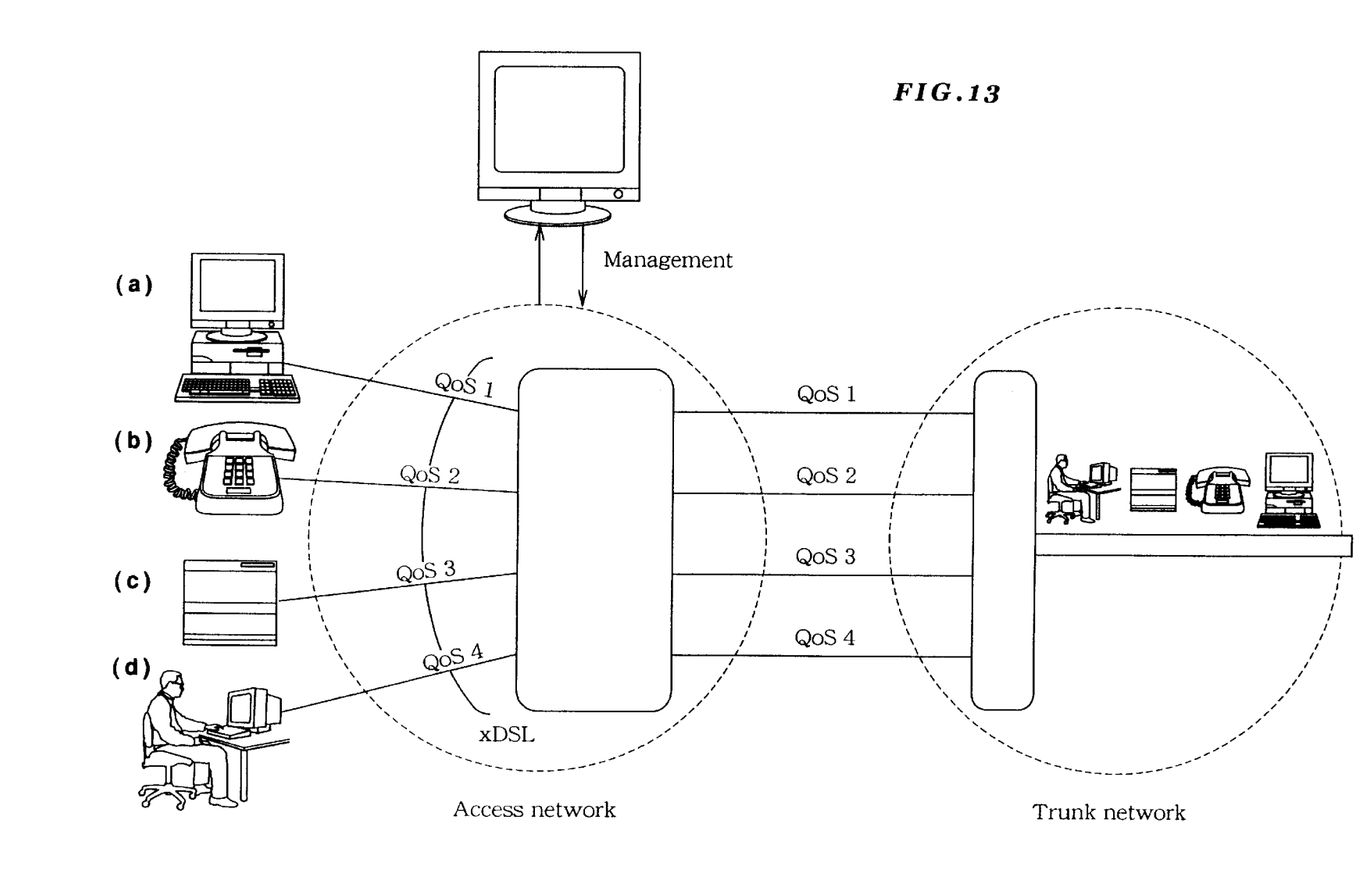
FIG. 13 is a block diagram of the network to which the present invention is applied.

However, by using the DSL (Digital Subscriber Line) technology such as an ADSL (Asynchronous Digital Subscriber Line), etc. as shown in FIG. 13, the network conventionally used only for telephone services is being used in proving various services requested by end users.

In the example shown in FIG. 13, (a) is a plan for transmitting an image (animation), (b) is a plan for telephone transmission, (c) is a plan for data transmission, and (d) is a plan for providing an Internet service.

The QoS for each of the services is represented by QoS 1, QoS 2, QoS 3, and QoS 4. The QoS 1 for animation transmission is strictly controlled against error and delay, and is demanded in high quality image transmission in real time while the QoS 1 for telephone transmission allows some errors but is strictly controlled against delay.

The QoS 3 for data transmission allows some delay, but is strictly controlled against error.

The QoS 4 for Internet provides a service is not so strict against delay or error, but is provided at a lower cost.

The xDSL shown in FIG. 13 is short for various DSLs such as an ADSL, etc.

Each service depends on each path up to the access network, and the QoS of the path should be monitored based on the value of the demanded QoS. However, such a QoS management apparatus has not been developed.

BRIEF SUMMARY OF THE INVENTION

Object of the Invention

As described above, the conventional QoS management apparatus has the problem that the QoS demanded for the paths cannot be precisely satisfied when there are various types of QoS demanded for each of the paths.

The present invention has been developed to solve all the above described problems, and aims at providing the QoS management apparatus capable of precisely satisfying the QoS demanded for the paths.

SUMMARY OF THE INVENTION

The QoS management apparatus according to the present invention comprises:

a registered QoS where value of QoS requested for each path is registered;

a QoS monitor for monitoring the current value of the QoS of the path; and means for determining an operation for determining a predetermined operation depending on the ratio of the value of the QoS monitored by the QoS monitor to the value of the QoS registered as a registered QoS.

With the configuration, the QoS management apparatus according to the present invention can precisely satisfy a demanded QoS.

That is, the QoS management apparatus of the present invention is characterized by comprising:

a registered QoS, provided for each of the plurality of paths, for storing values of QoS requested for the path;

a QoS monitor, provided for each of the plurality of paths, for monitoring the current value of the QoS of the path; and a function of determining an operation for comparing a value of the QoS obtained by monitoring through the QoS monitor of the path with a value of the QoS registered in the registered QoS of the path, and for determining the next operation to be performed depending on the comparison result.

The operation determination function is characterized by comprising:

a timer for measuring a continuation time of the value of the QoS monitored by the QoS monitor;

a comparator for comparing the value of the QoS measured by the timer as a continuation time longer than a predetermined time; and a function of performing an operation predetermined corresponding to the comparison result obtained by the comparator.

The QoS is characterized by being determined by a BER (Bit Error Rate), the registered QoS being a registered BER, and the QoS monitor being a BER monitor.

The QoS is characterized by being determined by a UAS (Unavailable Seconds), the registered QoS being a registered UAS, and the QoS monitor being a UAS monitor.

The QoS is characterized by being determined by a transfer delay of data packet, including CTD (Cell Transfer Delay), the registered QoS being a registered transfer delay of data packet, including registered CTD, and the QoS monitor being a monitor for a transfer delay of data packet, including a CTD monitor.

The QoS is characterized by being determined by a delay variation of data packet, including CDV (Cell Delay Variation), the registered QoS being a registered delay variation of data packet, including CDV, and the QoS monitor being a monitor for delay variation of data packet, including a CDV monitor.

The QoS is characterized by being determined by a loss of data packet, including CL (Cell Loss), the registered QoS being a registered loss of data packet, including CL, and the QoS monitor being a monitor for loss of data packet, including a CL monitor.

The operation determination function is characterized in that when the value of a QoS monitored by the QoS monitor does not satisfy the value of a QoS registered as the registered QoS, or when it is determined that there is a possibility of the monitored value not satisfying the registered value, the operation function so notifies a manager, and the manager activates a predetermined operation program.

The operation determination function is characterized in that when the value of a QoS monitored by the QoS monitor does not satisfy the value of a QoS registered as the registered QoS, or when it is determined that there is a possibility of the monitored value not satisfying the registered value, the operation function activates a predetermined operation program.

The predetermined operation program is characterized by containing a route amendment program of the path, and the route amendment program optimally utilizing network resources, and the program being executed considering the deterioration of the QoS accompanied by an amendment of a route.

A QoS management apparatus for managing a QoS of a network containing a plurality of paths for which different QoS are requested, characterized by comprising:

a function of dividing the plurality of paths into a plurality of service groups, and a service group comprising a path or a group of paths having a plurality of similar QoS requests;

a registered QoS, provided for each of the plurality of service groups, for storing the value of a QoS requested for the service group;

a QoS monitor, provided for each of the plurality of service groups, for monitoring by a time sharing system the current value of the QoS of each path belonging to the service group; and an operation determining function, provided for each of said plurality of service groups, for comparing a value of a QoS obtained by a QoS monitor of the service group with the value of a QoS registered in a registered QoS of the service group, and for determining the next operation to be performed according to a comparison result.

The operation determination function is characterized in that when the current value of a QoS of a path in any of the service groups becomes smaller than the QoS value registered in the registered QoS of the service group, the operation determining function determines that a QoS requested for the service group is not satisfactory.

The operation determination function is characterized in that when the current values of the QoS of all paths of the service groups become lower than the QoS value registered in the registered QoS of the service group, the operation determining function determines that a QoS requested for the service group is not satisfactory.

The operation determination function is characterized in that when, in the service group, the number of the paths whose current values of the QoS are lower than the QoS value registered in the registered QoS of the service group becomes larger than the number of the paths whose current values of the QoS are lower than the QoS value registered in the registered QoS of the service group, the operation determining function determines that the QoS requested for the service group is not satisfactory.

In a QoS management apparatus for managing a QoS when various services for which different QoS is requested are transmitted through a common line, the QoS corresponding to the service is characterized by being managed depending on the value of the QoS requested for the service.

DETAILED DESCRIPTION OF THE PREFERRED EMBODIMENTS

The embodiments of the present invention will be described below in detail by referring to the attached drawings.

Figure 1:
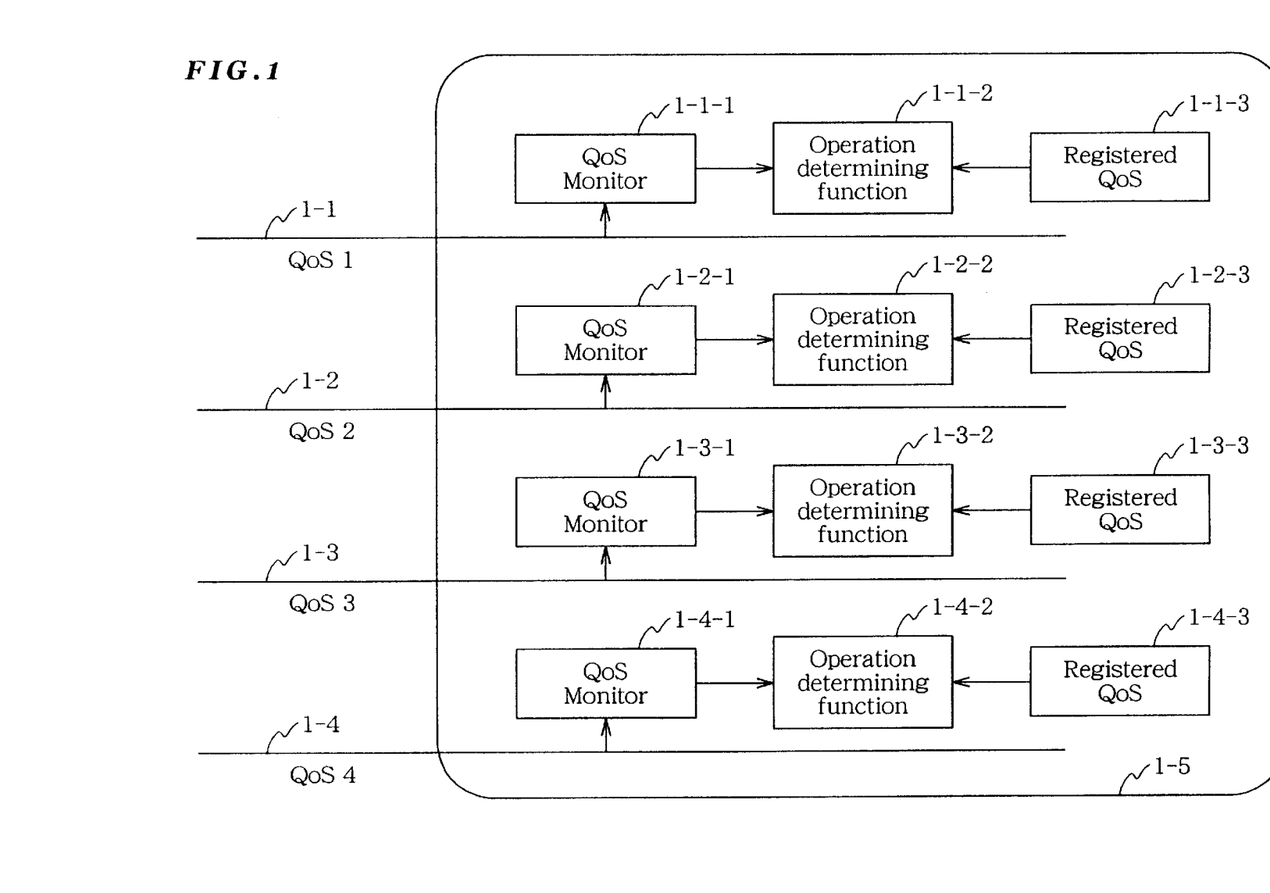
FIG. 1 is a block diagram showing an embodiment of the present invention.

FIG. 1 is a block diagram showing an embodiment of the present invention. In FIG. 1, 1-1, 1-2, 1-3, and 1-4 indicate paths. The QoS for each path has the value indicated by each of QoS 1, QoS 2, QoS 3, and QoS 4 shown in FIG. 1.

Each path is provided with a registered QoS, and the QoS requested for the path is registered as a registered QoS.

That is, the QoS 1 is registered in a registered QoS 1-1-3 provided in the path 1-1, the QoS 2 is registered in a registered QoS 1-2-3 provided in the path 1-2, the QoS 3 is registered in a registered QoS 1-3-3 provided in the path 1-3, and the QoS 4 is registered in a registered QoS 1-4-3 provided in the path 1-4.

A QoS monitor 1-1-1 is provided to monitor the current value of the QoS of the path 1-1. A QoS monitor 1-2-1 is provided to monitor the current value of the QoS of the path 1-2. A QoS monitor 1-3-1 is provided to monitor the current value of the QoS of the path 1-3. A QoS monitor 1-4-1 is provided to monitor the current value of the QoS of the path 1-4.

An operation determining function 1-1-2 constantly compares the current value of the QoS of the path 1-1 measured by the QoS monitor 1-1-1 with the value of the QoS registered in the registered QoS 1-1-3, and determines the next operation to be performed based on the comparison result.

An operation determining function 1-2-2 constantly compares the current value of the QoS of the path 1-2 measured by the QoS monitor 1-2-1 with the value of the QoS registered in the registered QoS 1-2-3, and determines the next operation to be performed based on the comparison result.

Similarly, an operation determining function 1-3-2 constantly compares the current value of the QoS of the path 1-3 measured by the QoS monitor 1-3-1 with the value of the QoS registered in the registered QoS 1-3-3, and determines the next operation to be performed based on the comparison result. An operation determining function 1-4-2 constantly compares the current value of the QoS of the path 1-4 measured by the QoS monitor 1-4-1 with the value of the QoS registered in the registered QoS 1-4-3, and determines the next operation to be performed based on the comparison result.

Thus, since the QoS of each path is managed, the QoS can be precisely managed.

Figure 2:
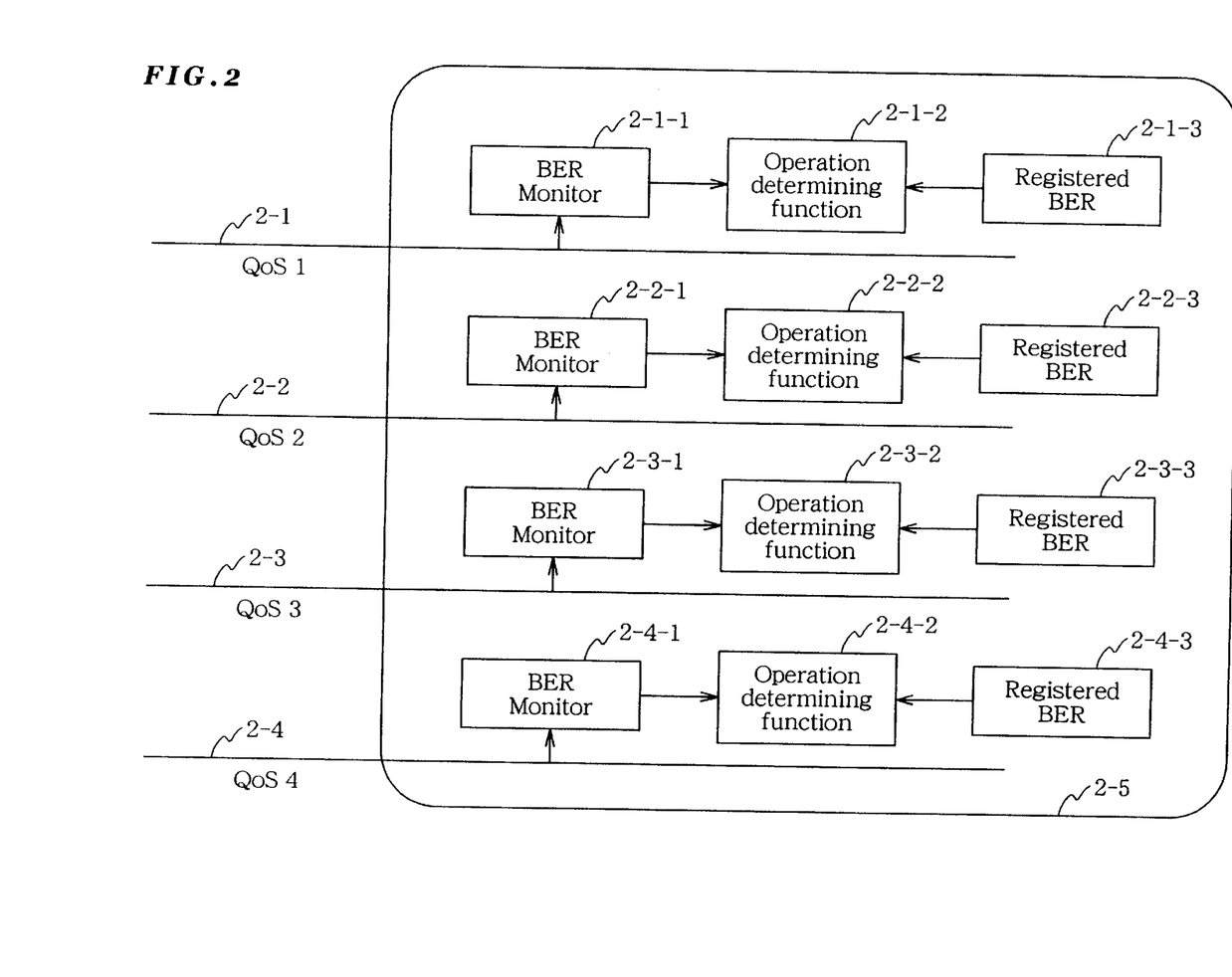
FIG. 2 is a block diagram showing an example of the configuration more practical than that shown in FIG. 1.

FIG. 2 is a block diagram of the embodiment more practical than that shown in FIG. 1. In FIG. 2, the QoS 1, QoS 2, QoS 3, and QoS 4 are represented by the BER (Bit Error Rate), and depends on each path.

The paths 1-1, 1-2, 1-3, and 1-4 shown in FIG. 1 are replaced with paths 2-1, 2-2, 2-3, and 2-4. The QoS monitors 1-1-1, 1-2-1, 1-3-1, and 1-4-1 shown in FIG. 1 are replaced with monitors 2-1-1, 2-2-1, 2-3-1, and 2-4-1. The operation determining functions 1-1-2, 1-2-2, 1-3-2, and 1-4-2 shown in FIG. 1 are replaced with operation determining functions 2-1-2, 2-2-2, 2-3-2, and 2-4-2. The registered QoS 1-1-3, 1-2-3, 1-3-3, and 1-4-3 shown in FIG. 1 are replaced with registered BERs 2-1-3, 2-2-3, 2-3-3, and 2-4-3. Thus, the apparatus shown in FIG. 2 can be obtained.

Figure 3:
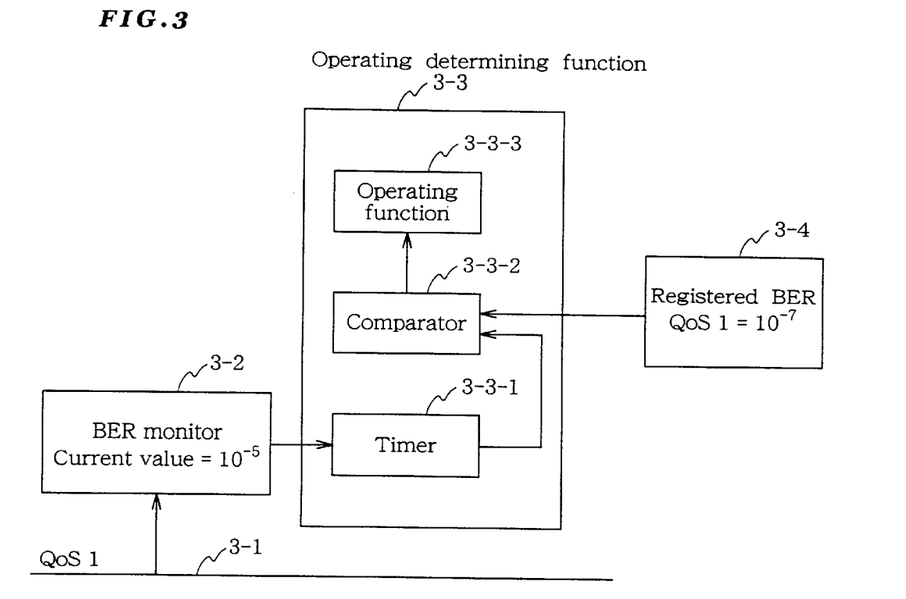
FIG. 3 is a block diagram showing an example of the configuration of the operation determining function shown in FIG. 2.

FIG. 3 is a block diagram showing an example of the internal configuration of the operation determining functions (2-1-2, 2-2-2, 2-3-2, and 2-4-2) shown in FIG. 2. Since the operation determining functions 2-1-2, 2-2-2, 2-3-2, and 2-4-2 have the same internal configuration, the operation determining function 2-1-2 shown in FIG. 2 is described as an example, and is shown as a code 3-3 in FIG. 3.

Codes 3-1, 3-2, and 3-3 respectively indicates the 2-1, 2-1-1, and 2-1-3 shown in FIG. 2. The value of of QoS1 $10^{-7}$ is registered as a registered BER.

An operation determining function 3-3 includes a timer 3-3-1, a comparator 3-3-2, and an operating function 3-3-3.

The timer 3-3-1 receives a BER value monitored by the BER monitor 3-2, and outputs the BER value maintained longer than a predetermined time to the comparator 3-3-2.

For example, when the current value of the BER monitored by the BER monitor is $10^{-5}$, and does not satisfy the requested BER value of $10^{-7}$, the current value of the BER is not accepted if the continuation time is within the range of the predetermined time set in the timer 3-3-1.

The current value of the BER continuing longer than a predetermined time reaches the comparator 3-3-2 from the BER monitor 3-2 through the timer 3-3-1, and is compared with the value of the registered BER 3-4. When the current value of the BER does not satisfy the requested value of the BER registered as a registered BER, then an operation predetermined by the operating function 3-3-3 is performed.

An operation to be performed by the operating function 3-3-3 depends on the service to be provided. Services to be provided are listed below.

1. Maintaining the QoS: To maintain a requested QoS, the schedule of, for example, amending a route for each time period, etc., is determined. A requested QoS is compared with a realized QoS and indicated in a list and a graph. An accounting management can be performed relating to the requested QoS and the realized QoS.

2. A manager is informed of a path which does not satisfy a requested QoS by raising an alarm, and the manager performs the next operation.

In this case, an alarm is raised also when there is the possibility that a requested QoS is not satisfactory.

3. Route amendment to a path: The route of the path which does not satisfy a requested QoS is amended. However, if the route amendment influences the QoS of another path, an agreement should be made, and the deterioration of the QoS due to the amendment of the route should also be taken into account.

Figure 4:
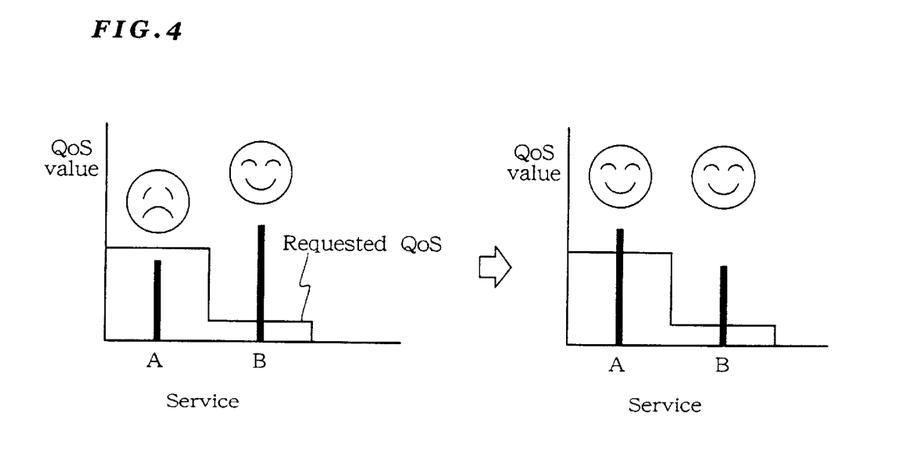
FIG. 4 is a graph showing the effect of changing a route as an operation of the QoS management shown in FIG. 2.

For example, in the left drawing shown in FIG. 4, the current value of the QoS (bold line) does not satisfy the requested QoS (by step indication) for a service A. However, since the current value of the QoS satisfies the requested QoS for a service B, satisfactory services can be provided for both services A and B as shown on the right in FIG. 4 when the routes are exchanged between the services A and B.

Figure 5:
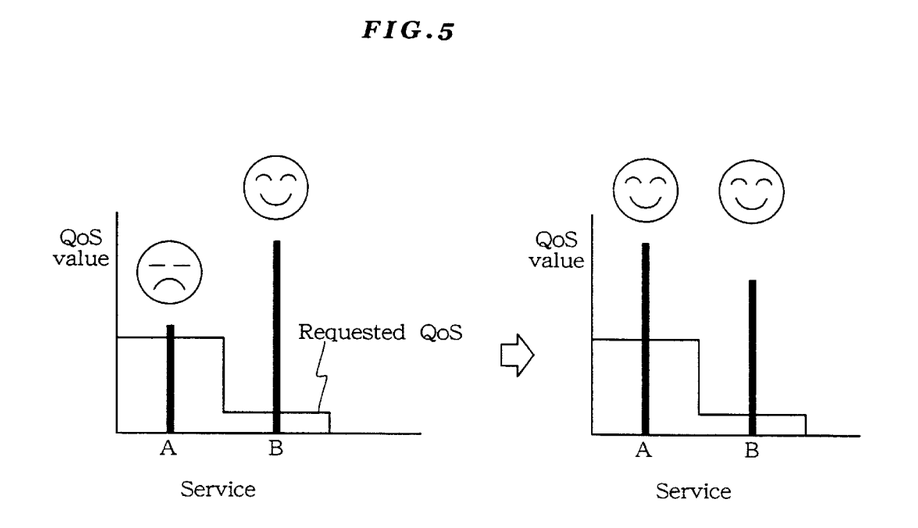
FIG. 5 is a graph showing the appropriate distribution of the network resources as an operation of the QoS management shown in FIG. 2.

4. Preferred distribution of the network resources:

FIG. 5 is a graph showing the preferable distribution of the network resources. $10^{-5}$ BER is registered for the requested QoS of the service A (path A). $10^{-3}$ BER is registered for the requested QoS of the service B (path B) (a QoS value shown in FIG. 5 is larger for a smaller BER value).

At this time, the route of the path A (assumed to be a route 1) has the BER value of $10^{-6}$, and the route of the path B (assumed to be a route 2) has the BER value of $10^{-9}$.

In this case, both paths A and B satisfy the requested QoS, but the path A should be the route 2 and the path B should be the route 1 for preferable distribution of the resources (by amending the state shown on the left to the state shown in the right shown in FIG. 5).

For example, in an ATM (Asynchronous Transfer Mode), the value of the registered QoS is enhanced by fully using an assigned band.

When a request to provide a new path is issued, a band is assigned to the new path, and the band of the existing path is decreased, thereby reducing the value of the registered QoS. However, the value of the requested QoS is still satisfactory. This can be realized as an appropriate distribution of the resources.

Back in FIG. 3, when the current value $10^{-5}$ of the BER monitored by the BER monitor 3-2 continues for a predetermined time, it is compared with the registered BER value of $10^{-7}$ by the comparator 3-3-2. In this case, since the current value of the BER does not satisfy the value of the QoS indicated by the registered BER value, the operating function 3-3-3 is activated.

When the operating function 3-3-3 is activated, a predetermined program is activated to automatically perform an amending operation, or the manager is invoked to activate a predetermined program.

Figure 6:
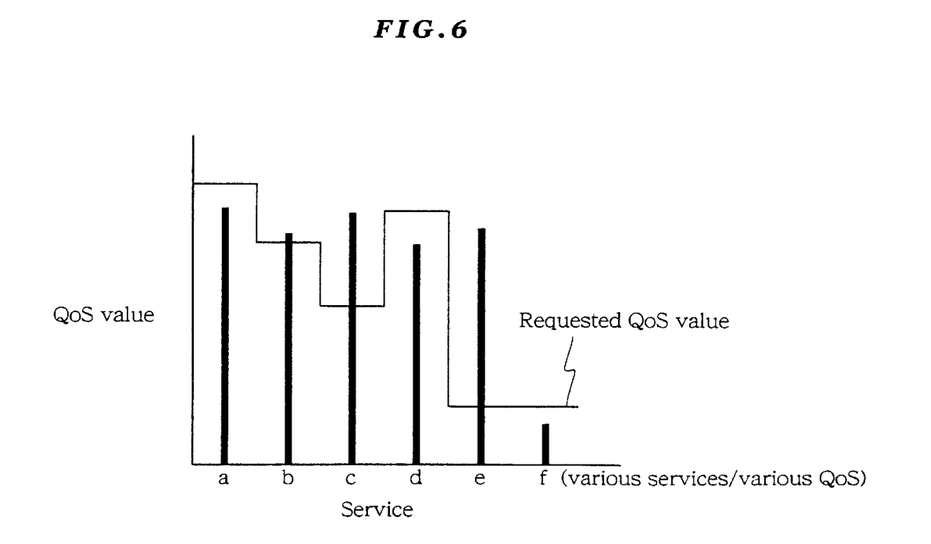
FIG. 6 is a graph showing the relationship between the requested QoS and the current value of the QoS when the apparatus shown in FIG. 1 is applied to various services.

FIG. 6 is a graph showing the QoS management for various services. As shown in FIG. 6, different QoS values are requested for six services a, b, c, d, e, and f.

In FIG. 6, the requested QoS value is indicated by the line forming steps, and the current value of the QoS obtained by the QoS monitor is indicated by the bold line. The value of the BER of the path on one line is, as a mean value for a long time, is determined by the physical property of the line and the occupation band of the path on the line. The value fluctuate for a short time about the mean value for the long time.

The momentary fluctuation in the short time fluctuation is removed by the timer 3-3-1, and the operation described above is performed on the fluctuation not removed by the timer 3-3-1.

According to the embodiments shown in FIGS. 2 and 3, the BER is used as the QoS.

However, the physical amount other than the BER can obviously be used as the QoS.

Figure 7:
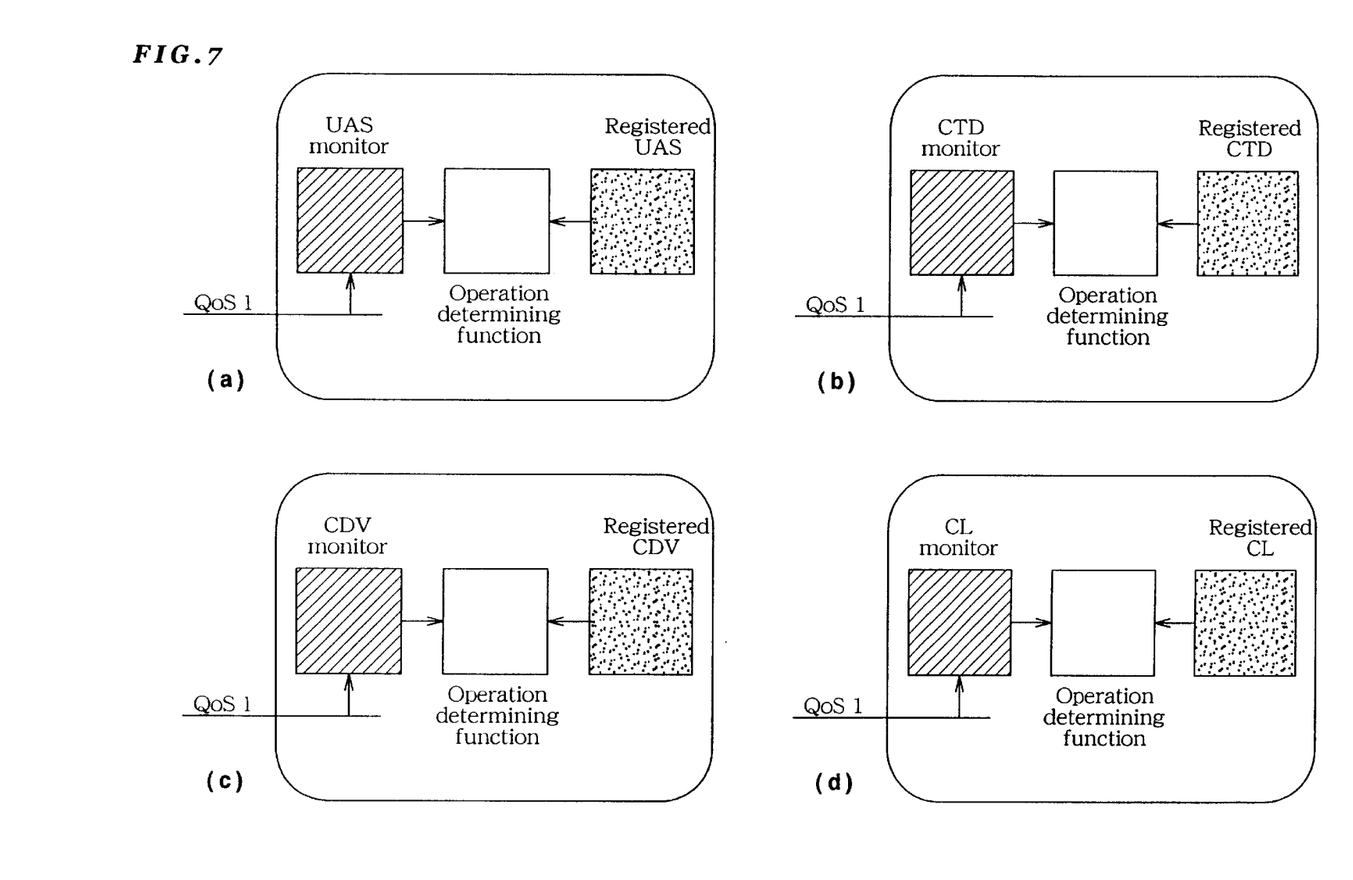
FIG. 7 is a block diagram showing various types of QoS shown in FIG. 1.

FIG. 7 is a block diagram showing an example of the physical amount indicating the QoS other than the BER. In FIG. 7, the UAS (Unavailable Seconds) is used as the QoS in (a), the CTD (Cell Transfer Delay) is used as the QoS in (b), the CDV (Cell Delay Variation) is used as the QoS in (c), and the CL (Cell Loss) is used as the QoS in (d).

Depending on the type of service, an appropriate value can be set as the QoS.

According to the embodiment shown in FIG. 1, the QoS of each path is managed in path units. However, in most cases, there are path groups having the same or similar requested QoS value.

These path groups are classified as a service group, and the QoS is managed for each service group.

Figure 8:
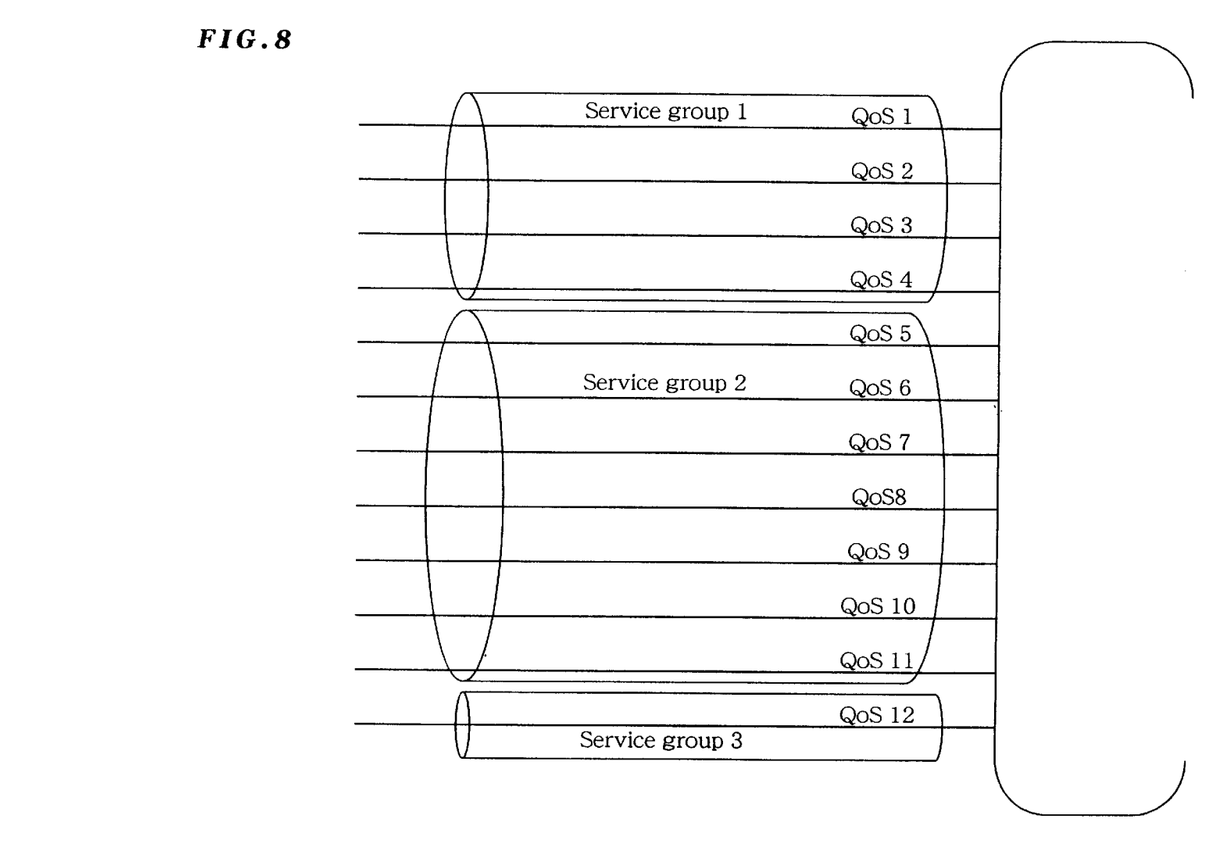
FIG. 8 is a block diagram showing the QoS management for each service group.

FIG. 8 is a block diagram showing another embodiment of the present invention. Since the values of the QoS 1, QoS 2, QoS 3, and QoS 4 requested for each path are similar to each other, these paths are classified as a service group 1. Since the values of the QoS 5, QoS 6, QoS 7, QoS 8, QoS 9, QoS 10, and QoS 11 are similar to each other, these paths are classified as a service group 2. The path whose requested QoS value is QoS 12 is a service group 3.

Figure 9:
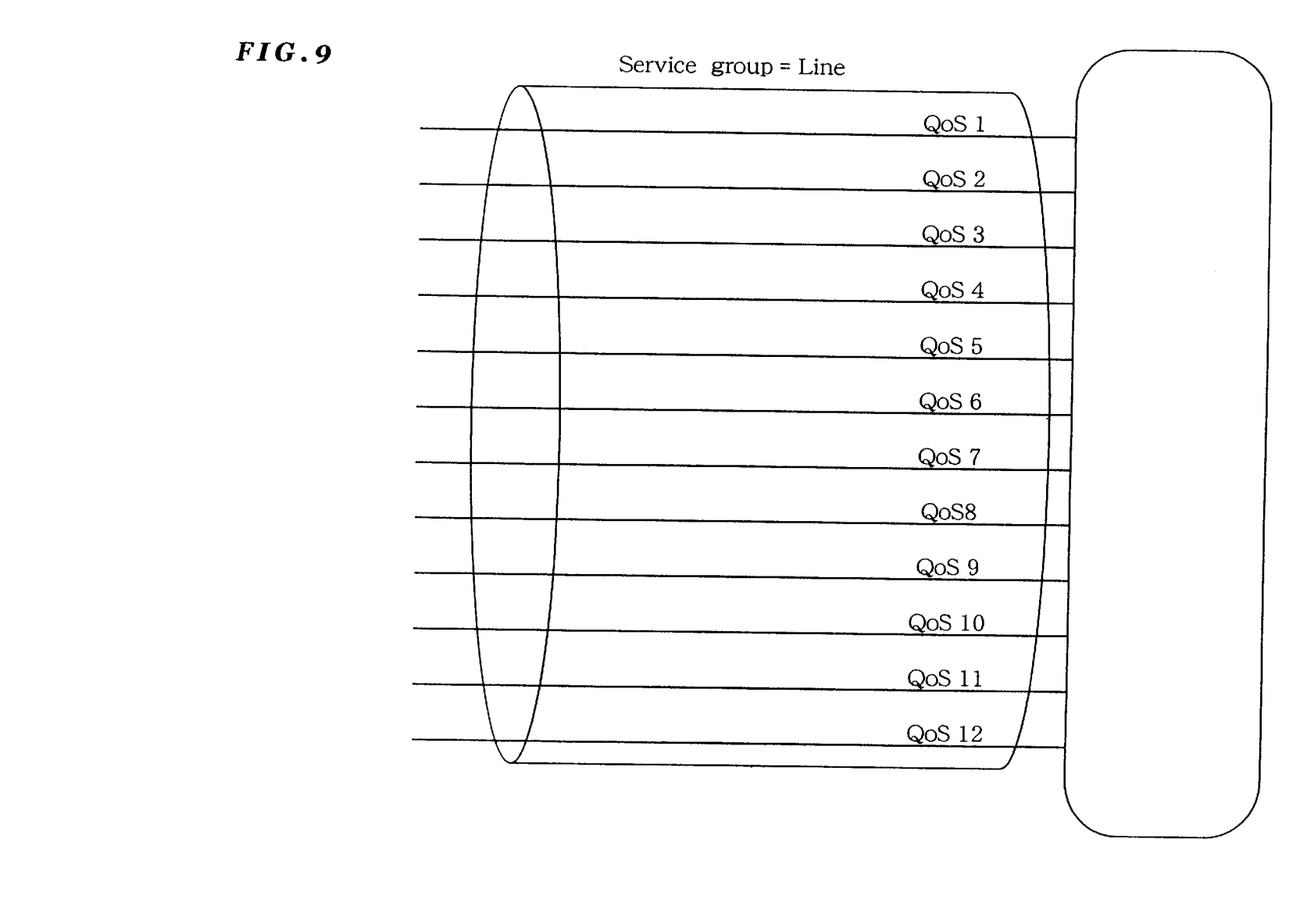
FIG. 9 is a block diagram showing an extreme example of the case shown in FIG. 8.

In an extreme case, for example, as shown in FIG. 9, all paths can be classified as one service group.

Figure 10:
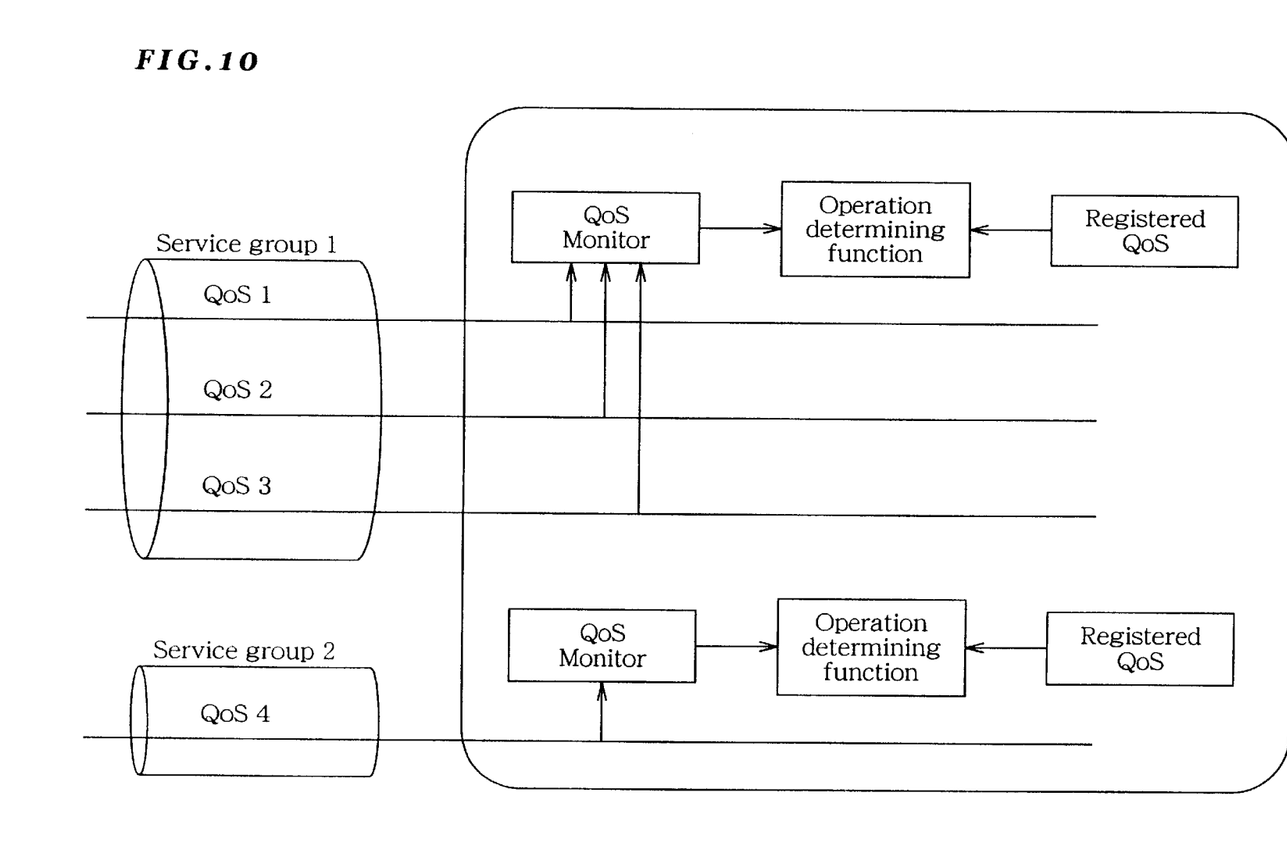
FIG. 10 is a block diagram of another embodiment of the present invention.

FIG. 10 is a block diagram of the QoS management performed for each service group. In this case, a QoS monitor, an operation determining function, and a registered QoS are provided for each service group. However, the QoS monitor provided for a service group is switched in a time sharing manner when monitoring the current value of the QoS of each path in the service group. Therefore, the following methods can be used when an operation is determined by an operation determining function:

1. When the current value of the QoS of any path does not satisfy the registered QoS value, it is determined for the service group that the requested QoS value is not satisfactory.

2. When the current value of the QoS of any path satisfies the registered QoS value, it is determined for the service group that the requested QoS value is satisfactory.

3. A majority decision is made. That is, when the number of paths whose registered QoS values are not satisfactory becomes larger than the number of paths whose registered QoS values are satisfactory, it is determined for the service group that the requested QoS value is not satisfactory.

As described above, according to the present invention, the QoS is managed for each path. Therefore, the QoS can be precisely managed. The route of a path whose requested QoS is not satisfactory can be change to realize the requested QoS. Furthermore, the distribution of the resources of a network can be optimized.

The invention may be embodied in other specific forms without departing from the spirit or essential characteristic thereof. The present embodiments are therefore to be considered in all respects as illustrative and not restrictive, the scope of the invention being indicated by the appended Claims rather than by the foregoing description and all changes which come within the meaning and range of equivalency of the Claims are therefore intended to be embraced therein.

The entire disclosure of Japanese Patent Application No. 10-156833 (Filed on May 22, 1998) including specification, claims, drawings and summary are incorporated herein by reference in its entirety.

What is claimed is:

1. A QoS management apparatus for managing a QoS of a network including a plurality of paths for which different QoS's are requested, comprising:

a registered QoS provided to each of the plurality of paths, the registered QoS storing a QoS value requested for the path to which it is provided;

a QoS monitor for each of the plurality of paths, each QoS monitor monitoring a current value of the QoS of its corresponding path; and an operation determiner comparing a particular path's current monitored QoS value with a registered QoS for the path, and determining a next operation to be performed depending on a result of the comparison.

2. The apparatus according to claim 1, wherein said operation determiner comprises:

a timer measuring a continuation time of the current monitored QoS value;

a comparator comparing the current monitored QoS value at a predetermined continuation time with a registered QoS value for the path; and an operation means performing an operation corresponding to the comparison result obtained by said comparator.

3. The apparatus according to claim 1, wherein said QoS is determined by a BER, said registered QoS is a registered BER, and said QoS monitors are BER monitors.

4. The apparatus according to claim 1, wherein said QoS is determined by a UAS, said registered QoS is a registered UAS, and said QoS monitors are UAS monitors.

5. The apparatus according to claim 1, wherein:

said QoS is determined by a time delay of data packets;

said registered QoS is a registered time delay of data packets; and said QoS monitors monitor the time delay of data packets.

6. The apparatus according to claim 1, wherein:

said QoS is determined by a delay variation of data packets;

said registered QoS is a registered delay variation of data packets; and said QoS monitors monitor the delay variation of data packets.

7. The apparatus according to claim 1, wherein:

said QoS is determined by a loss of data packets;

said registered QoS is a registered loss of data packets; and said QoS monitors monitor the loss of data packets.

8. The apparatus according to claim 2, wherein when a current monitored QoS value does not satisfy a value of a registered QoS, or when it is determined that there is a possibility that the current monitored QoS value does not satisfy the registered QoS, said operation means so notifies a manager, and the manager activates an operation program.

9. The apparatus according to claim 2, wherein when a current monitored QoS value of a particular path does not satisfy the registered QoS of the path, or when it is determined that there is a possibility of the current monitored QoS value not satisfying the registered QoS value, said operation means activates an operation program.

10. The apparatus according to claim 8, wherein said operation program contains a route amendment program that reroutes the path, said route amendment program optimally utilizing network resources, and said route amendment program being executed taking into consideration any deterioration of the QoS caused by rerouting of the path.

11. The apparatus according to claim 9, wherein said operation program contains a route amendment program that reroutes the path, said route amendment program optimally utilizing network resources, and said route amendment program being executed taking into consideration any deterioration of the QoS caused by rerouting the path.

12. A QoS management apparatus that manages a QoS of a network including a plurality of paths for which different QoS's are requested, comprising:

means for dividing said plurality of paths into a plurality of service groups, and a service group comprising a path or a group of paths having a plurality of QoS requests similar to each other;

a registered QoS, provided for each of said plurality of service groups, said registered QoS storing a value of a QoS requested for the service group;

a QoS monitor, provided for each of said plurality of service groups, each QoS monitor monitoring a current value of the QoS of each path belonging to the service group by a time sharing system; and an operation determiner, provided for each of said plurality of service groups, said determiner comparing the current monitored QoS value of a particular service group with the registered QoS of a particular service group, and determining a next operation to be performed according to a result of the comparison.

13. The apparatus according to claim 12, wherein when the current monitored QoS value of a particular path in any of the service groups becomes lower than a registered QoS for the service group, said operation determiner determines that the QoS for the service group is not satisfactory.

14. The apparatus according to claim 12, wherein when current monitored QoS values for all paths of the service groups become lower than a registered QoS of the service group, said operation determiner determines that a QoS requested for the service group is not satisfactory.

15. The apparatus according to claim 12, wherein, in the service group, a number of paths whose current values of QoS are lower than a registered QoS of the service group becomes larger than a number of paths whose current monitored QoS values satisfy a QoS registered value of the service group, said operation determiner determines that a QoS requested for the service group is not satisfactory.

16. A QoS management apparatus that manages a QoS comprising:

a common line through which various services for which different QoS's are requested are transmitted; and a manager that manages a QoS corresponding to a particular service depending on a value of the QoS requested for the service.

* * * * *